US009961483B1

(12) United States Patent
Berchanskiy et al.

(10) Patent No.: US 9,961,483 B1
(45) Date of Patent: May 1, 2018

(54) WIRELESS CHARGER CROSS-TALK PREVENTION

(71) Applicants: Dmitriy Berchanskiy, Roseville, CA (US); Nikhil M. Rajpal, Hillsboro, OR (US)

(72) Inventors: Dmitriy Berchanskiy, Roseville, CA (US); Nikhil M. Rajpal, Hillsboro, OR (US)

(73) Assignee: Intel Coporation, Santa Clara, CA (US)

( * ) Notice: Subject to any disclaimer, the term of this patent is extended or adjusted under 35 U.S.C. 154(b) by 0 days. days.

(21) Appl. No.: 15/395,366

(22) Filed: Dec. 30, 2016

(51) Int. Cl.
  *H04W 4/00* (2018.01)
  *H04B 5/00* (2006.01)
  *H04W 8/00* (2009.01)
  *H02J 50/12* (2016.01)
  *H02J 7/02* (2016.01)

(52) U.S. Cl.
  CPC ............ *H04W 4/008* (2013.01); *H02J 7/025* (2013.01); *H02J 50/12* (2016.02); *H04B 5/0031* (2013.01); *H04B 5/0037* (2013.01); *H04W 8/005* (2013.01)

(58) Field of Classification Search
  CPC .... H04W 4/008; H04W 8/005; H04B 5/0031; H04B 5/0037; H02J 50/12; H02J 7/025
  USPC ....................................................... 455/41.2
  See application file for complete search history.

(56) References Cited

U.S. PATENT DOCUMENTS

| | | | | |
|---|---|---|---|---|
| 8,338,991 B2* | 12/2012 | Von Novak | ............. | H02J 17/00 307/104 |
| 8,796,887 B2* | 8/2014 | Von Novak | ............. | H02J 17/00 307/104 |
| 9,106,268 B2* | 8/2015 | Luong | ....................... | H04B 5/00 |
| 2010/0277003 A1* | 11/2010 | Von Novak | ............. | H02J 17/00 307/104 |
| 2013/0113299 A1* | 5/2013 | Von Novak | ............. | H02J 17/00 307/104 |
| 2013/0328407 A1* | 12/2013 | Shimura | .................. | H02J 7/025 307/104 |
| 2014/0070621 A9* | 3/2014 | Von Novak | ............. | H02J 17/00 307/104 |
| 2014/0073241 A1* | 3/2014 | Luong | ....................... | H04B 5/00 455/41.1 |
| 2014/0128032 A1* | 5/2014 | Muthukumar | ........... | H01Q 3/00 455/411 |
| 2016/0197510 A1* | 7/2016 | Strommer | ............ | H04B 5/0031 320/108 |
| 2016/0380467 A1* | 12/2016 | Shao | ....................... | H02J 7/025 320/108 |

* cited by examiner

*Primary Examiner* — Hai V Nguyen
(74) *Attorney, Agent, or Firm* — Eversheds Sutherland (US) LLP

(57) ABSTRACT

This disclosure describes systems, methods, and devices related to wireless charger cross-talk prevention system. A power transmitting unit (PTU) may determine a power receiving unit (PRU) of one or more PRUs in proximity to a charging area of the PTU. The PTU may detect a communication link between the PTU and the PRU. The PTU may generate an enhanced message, including one or more identifying information associated with the PTU. The PTU may cause to send the enhanced message to the PRU.

20 Claims, 9 Drawing Sheets

WIRELESS CHARGER CROSS-TALK PREVENTION

TECHNICAL FIELD

This disclosure generally relates to systems and methods for wireless charging stations and, more particularly, to wireless charger cross-talk prevention.

BACKGROUND

Wireless charging or inductive charging uses an electromagnetic field to transfer energy between devices. Wireless charging may be implemented at a charging station. Energy is sent from one device to another device through an inductive coupling. The inductive coupling is used to charge batteries or run a device. Power is delivered through non-radiative, near field, electromagnetic resonance from a power transmitting unit (PTU) to a power receiving unit (PRU).

DETAILED DESCRIPTION

Figure 1:
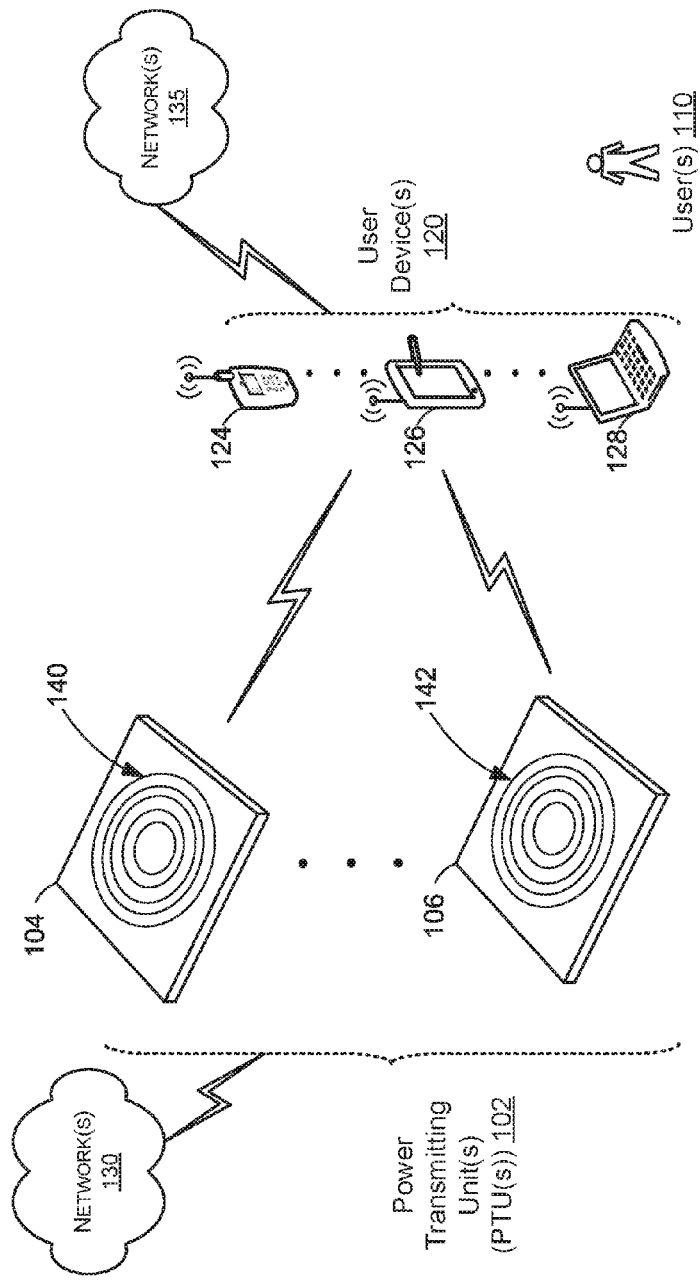
FIG. 1 illustrates a network diagram illustrating an example network environment for wireless charger cross-talk prevention, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A power transmitting unit (PTU) may transmit power wirelessly to charge one or more power receiving units (PRUs). The PTU's current conducted through its coil generates a magnetic field. PRUs placed in this magnetic field convert the magnetic field into a voltage that is used for powering the PRU or charging the battery. PRUs placed in the PTU's magnetic field area send back their operation information to the PTU during various stages of wireless charging. For example, during a handshake procedure, where a PRU may advertise its capabilities to the PTU, the one or more PRUs placed in the PTU's magnetic field area may send back their operation information to the PTU. Such information may include a PRU's rectifier voltage and the rectifier current, among other parameters.

Cross-talk (also referred to as cross-connection) is a major problem for the wireless charging systems. Cross-talk may be a condition when a device, such as a PRU, is placed on a charging surface of a charging device, such as a PTU, where the device receives power from one charging device, but controls another charging device because of a coil impedance change with the other charging device. The results could be damage to either the charging device or the devices on the other charging device.

Example embodiments of the present disclosure relate to systems, methods, and devices for NFC detection.

When a PRU is either placed on or removed from the PTU, impedance of the PTU may change. When the PRU is placed on the PTU, the impedance of the system may increase. After the PRU and the PTU establish a communication link (e.g., a bluetooth link), the PTU's power output may be dictated by PRUs based on their need and their category. However, in public places, there is a likelihood that a PRU may establish a communication link with an adjacent PTU while it is charging on a current PTU. Public places may include places such as conference rooms, airports, cafeterias, etc. When the PRU establishes a communication link with the adjacent PTU, the PRU may control this adjacent PTU resulting in wireless charging cross-talk from one PRU to two PTUs.

In one embodiment, a PTU may embed a message, using either binary phase shift key (BPSK) or any other PSK modulated techniques into a sine signal generated by the power coil of the PTU and transmit it to PRUs in proximity of the PTU.

In one embodiment, a PTU system may deliver the embedded message to one or more PRUs that are determined to be placed on or are determined to be near the PTU at a predetermined time.

In one embodiment, a PTU may determine that the embedded message is comprised at least in part of a unique PTU's medium access control (MAC) address, a unique coil number, or a randomly generated number. If the PRU receives the MAC address of the PTU, the PRU may determine, based on that information, whether it is supposed to be connected to that PTU. On the other hand, if a message is a randomly generated number by a PTU, the PRU has to transmit this message back via the communication link, and the PTU will make a decision to keep the PRU connected or to disconnect it.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 depicts a network diagram illustrating an example network environment for wireless charger cross-talk prevention, in accordance with one or more example embodiments of the present disclosure, which may include one or more user devices 120 and one or more wireless power transmitting units(s) (PTU(s)) 102. The one or more user devices 120 may be power receiving units (PRUs) operable by one or more user(s) 110. While FIG. 1 shows PRUs including laptop 128 and smart user devices 124 and 126, the disclosed principles are not limited thereto and may include any device capable of wireless charging (e.g., a lamp).

Figure 6:
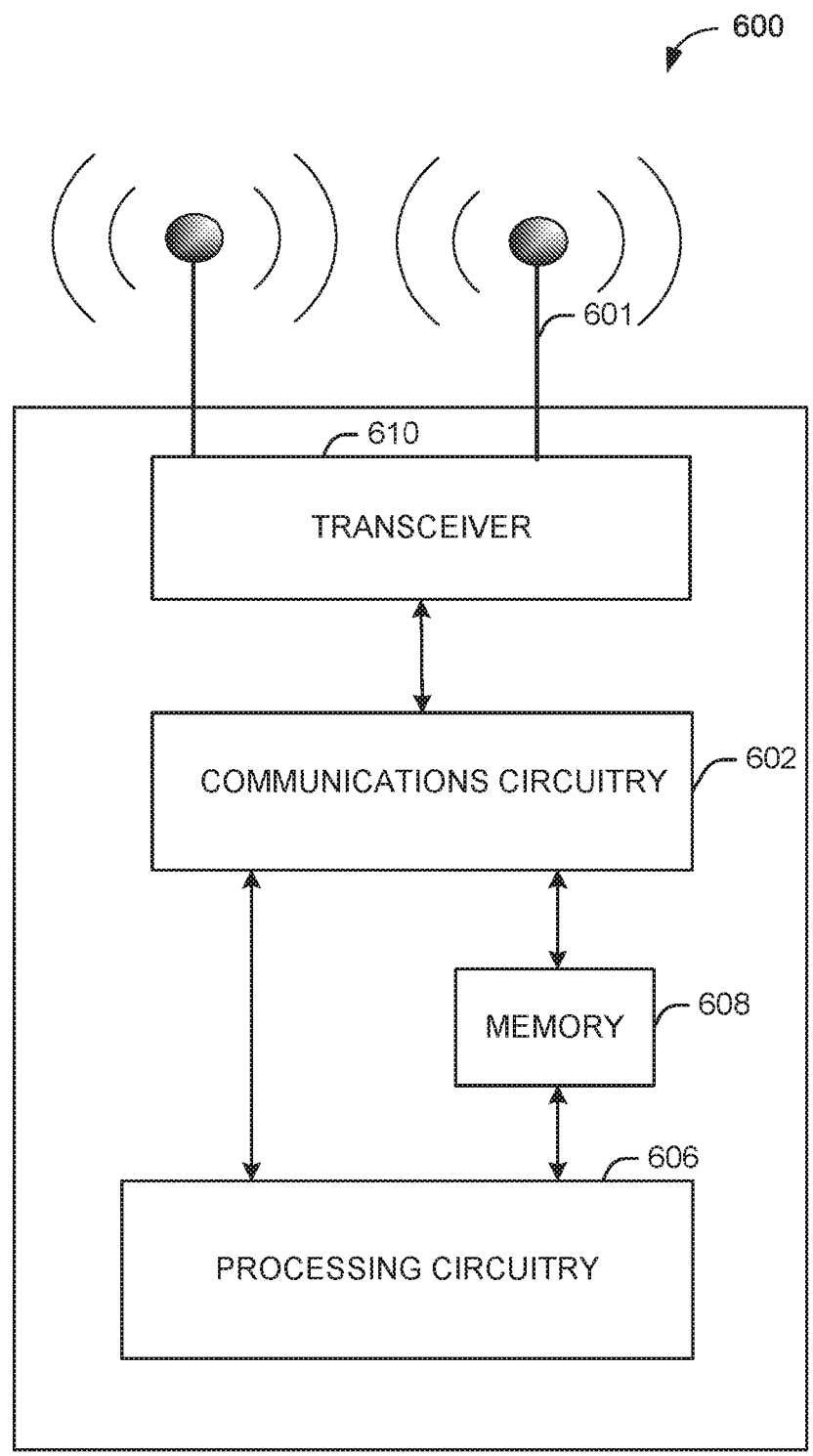
FIG. 6 illustrates a functional diagram of an example communication station that may be suitable for use as a user device, in accordance with one or more example embodiments of the disclosure.
Figure 7:
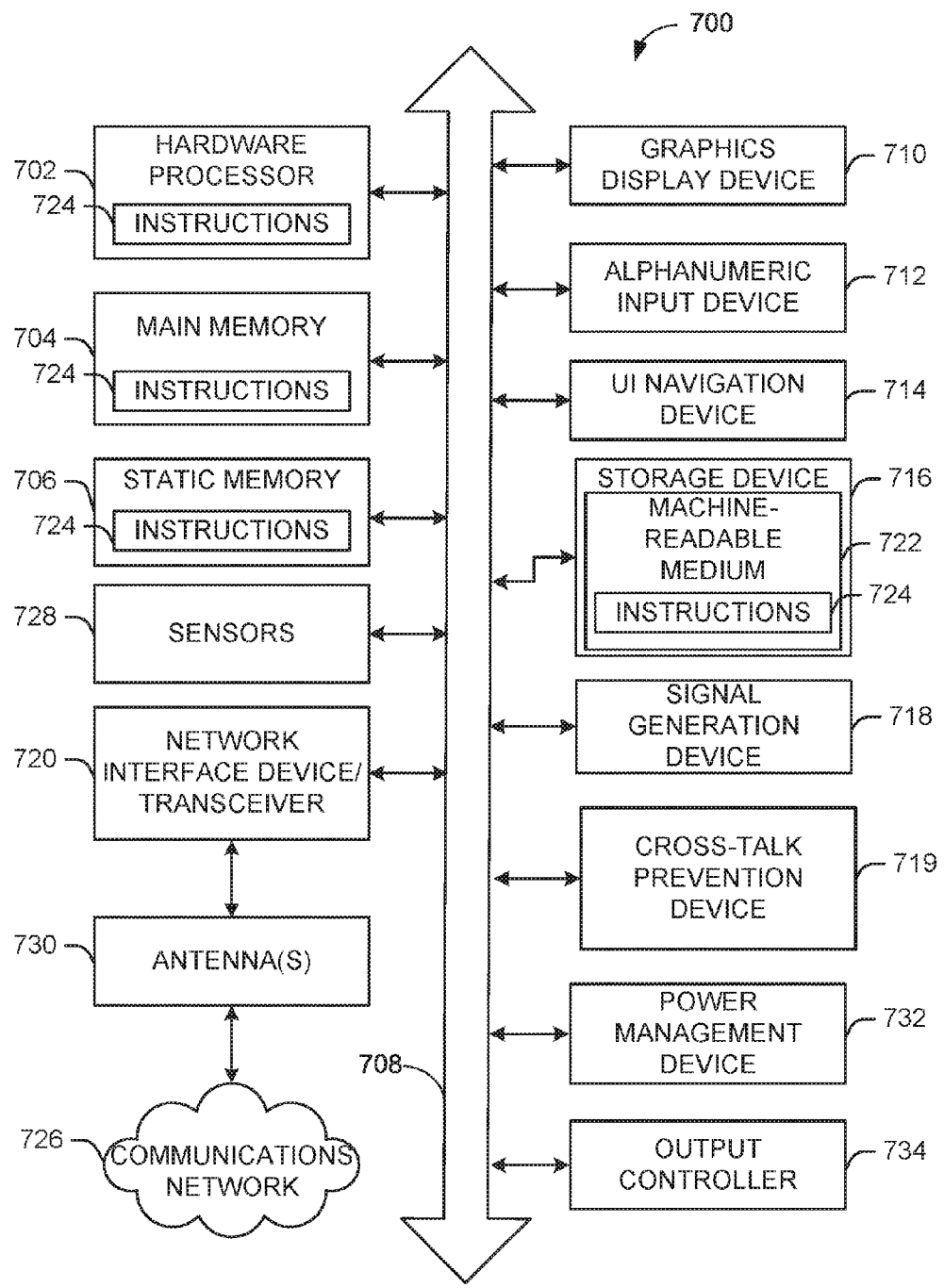
FIG. 7 illustrates a block diagram of an example machine upon which any of one or more techniques (e.g., methods) may be performed, in accordance with one or more embodiments of the disclosure.

In some embodiments, the user device(s) 120 and the PTU(s) 102 may include one or more computer systems similar to that of the functional diagram of FIG. 6 and/or the example machine/system of FIG. 7.

The user device(s) 120 (e.g., 124, 126, or 128) may be capable of being wirelessly charged. The user device(s) 120 (e.g., 124, 126, or 128) may include any suitable processor-driven device including, but not limited to, a mobile device or a non-mobile, e.g., a static, device. For example, user device(s) 120 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a portable device, a non-portable device, a lamp, and intelligent device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and the PTU(s) 102 (e.g., PTUs 104 and 106) may be configured to communicate with each other directly or via one or more communications networks 130 and/or 135 wirelessly or wired. The direct communication may include Bluetooth Low Energy (BLE), in-band modulation, or the like. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and the PTU(s) 102 (e.g., PTUs 104 and 106) may include one or more communications antennas. Communications antenna may be any suitable type of antenna corresponding to the communications protocols used by the user device(s) 120 (e.g., user devices 124, 126 and 128), and the PTU(s) 102 (e.g., PTUs 104 and 106). Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128) and the PTU(s) 102 (e.g., PTUs 104 and 106) may include any suitable radio and/or transceiver for transmitting and/or receiving radio frequency (RF) signals in the bandwidth and/or channels corresponding to the communications protocols utilized by any of the user device(s) 120 the PTU(s) 102 (e.g., PTUs 104 and 106) to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, one or more PTU(s) 102 (e.g., PTU 104 and PTU 106) may include one or more transmitting coils (e.g., coils 140 and 142), and the PRUs (e.g., user devices 120) may include one or more receiving coils. For example, energy may be transmitted from the transmitting coil to the receiving coil by electromagnetic induction between the two coils. This may cause the transmission of charging power from the PTU to the PRU in response to determining that the PRU is located within the charging area. The PTU may communicate with a PRU to receive information, such as identification information, power received, power needed, location, etc. For example, the user device 126 may connect to the PTU 104 in order to wirelessly charge itself. However, the PTU 106 may inadvertently connect to the user device 126. Hence, cross-talk may be created.

In one embodiment, a PRU may advertise its information using one or more communication protocols. For example, the PRU may utilize communication protocols, such as bluetooth low energy (BLE), in-band modulation, or the like, to advertise or transfer its PRU information to a PTU. The PRU information may contain static or dynamic PRU parameters. It is understood that although advertisement is done through BLE or in-band modulation, any other communication protocols that may be used for communicating between two devices may be used.

Figure 2:
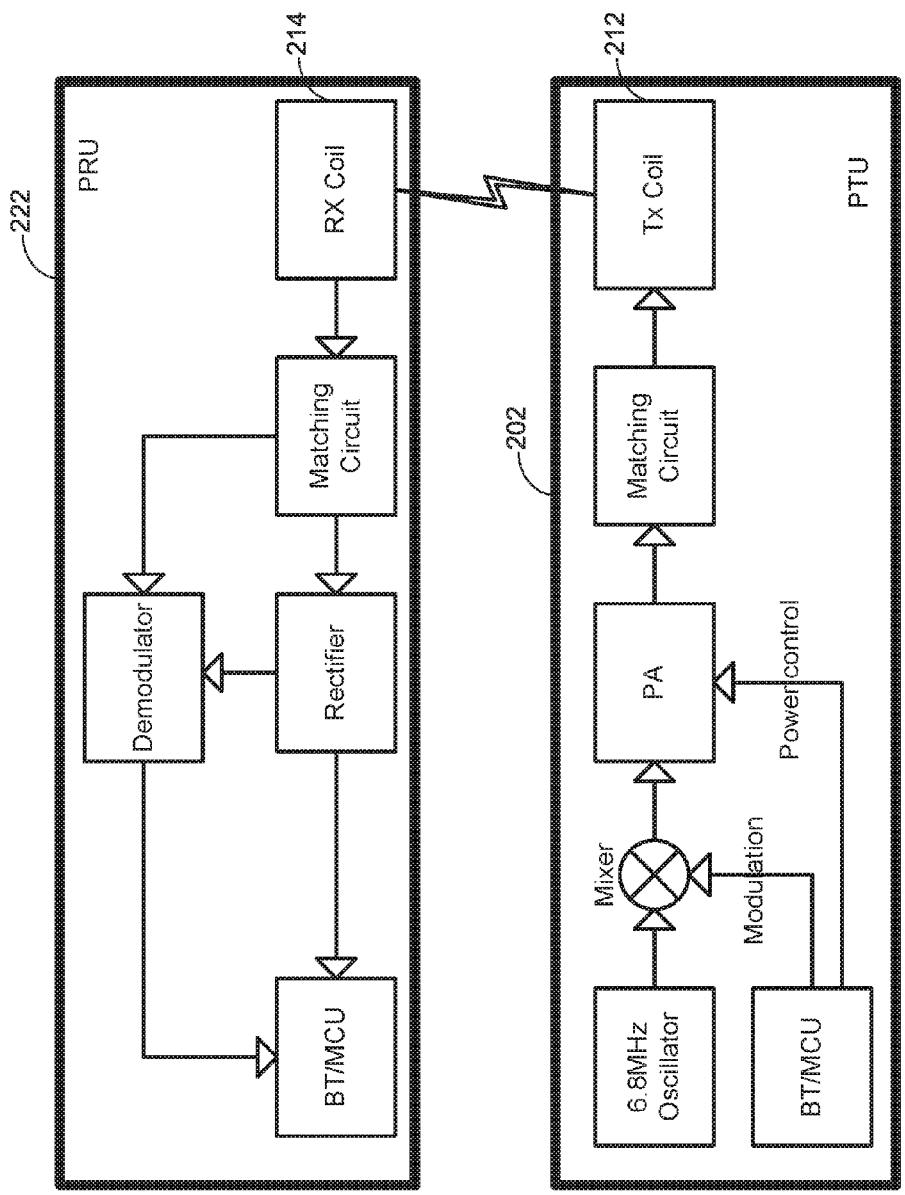
FIG. 2 illustrates a diagram for wireless charger cross-talk prevention, in accordance with one or more example embodiments of the present disclosure.

FIG. 2 illustrates a diagram for wireless charger cross-talk prevention, in accordance with one or more example embodiments of the present disclosure.

Referring to FIG. 2, there is shown a PTU 202 and a PRU 222 having one or more hardware components. For example, the PTU 202 may comprise at least in part an oscillator, a bluetooth/microcontroller, a mixer, a power amplifier, a matching circuit, and one or more transmit coils (e.g., TX coil 212). The PRU 222 may comprise at least in part one or more receive coils (e.g., RX coil 214), a matching circuit, a demodulator, a rectifier, and/or a bluetooth/microcontroller. It should be understood that although hardware components are shown, other hardware components may be included or may replace one or more of these listed hardware components.

A PTU may transmit power wirelessly to charge one or more PRUs. A PTU's current conducted through its coil may create a magnetic field. Any PRUs placed in this magnetic field may convert the magnetic field into a voltage that is used for powering the PRU or charging the battery. PRUs placed in the PTU's magnetic field area (e.g., on the charging surface of the PTU or in proximity to the PTU) may connect to the PTU through a communication link. The communication link may include a link in accordance with at least one of bluetooth low energy (BLE), in-band modulation, or any other communication protocols that may be used for communicating between two devices.

When a PRU is either placed on or removed from the PTU, impedance of the PTU may change. When the PRU is placed on the PTU, the impedance of the system may increase. After the PRU and the PTU establish a communication link (e.g., a BT link), the PTU's power output may be dictated by PRUs based on their need and their category. However, in public places, there is a likelihood that a PRU may establish a communication link with an adjacent PTU while it is charging on a current PTU. Public places may include places, such as conference rooms, airports, cafeterias, etc. When the PRU establishes a communication link with the adjacent PTU, the PRU may control this adjacent PTU resulting in wireless charging cross-talk from one PRU to two PTUs.

In one embodiment, the PTU 202 may prevent the cross-talk by using, for example, a BPSK signal to send one or more identifying information associated with the PTU 202. The BPSK signal may include an enhanced message that conveys one or more identifying information associated with the PTU 202. The enhanced message may consist of a sync signal, a MAC address of the PTU 202, a random number generated by the PTU 202, and/or a coil number associated with one of the TX coils 212 of the PTU 202.

In one embodiment, the PRU 222 may receive the enhanced message and may determine whether to respond to the PTU 202, or whether to disconnect the communication link. For example, the enhanced message may indicate to the PRU 222 to send back a feedback message. If the PRU 222 sends back the feedback message to the PTU 202 using the communication link, the PRU 222 may include at least one of the one or more identifying information in the feedback message. When the PTU 202 receives the feedback message, the PTU 202 may determine that the PRU 222 is intended to be charged by the PTU 202. In one embodiment, even if the PTU 202 receives the feedback message, the PTU 202 may perform comparison of the at least one of the one or more identifying information from the feedback message to the one or more identifying information sent in the enhanced message. This is performed in order to confirm that the PRU 222 sent back the correct information. In this scenario, the PTU 202 may maintain the communication link with the PRU 222 and may keep the PRU 222 in the communication link list. The communication link list may include one or more PRUs that are capable or otherwise authorized to charge their batteries using the PTU 202 charging coil(s). However, if the PRU 222 does not respond back with the feedback message, the PTU 202 may disconnect the communication link and may remove the PRU 222 from the communication link list. It is understood that the above descriptions are for purposes of illustration and are not meant to be limiting.

Figure 3A:
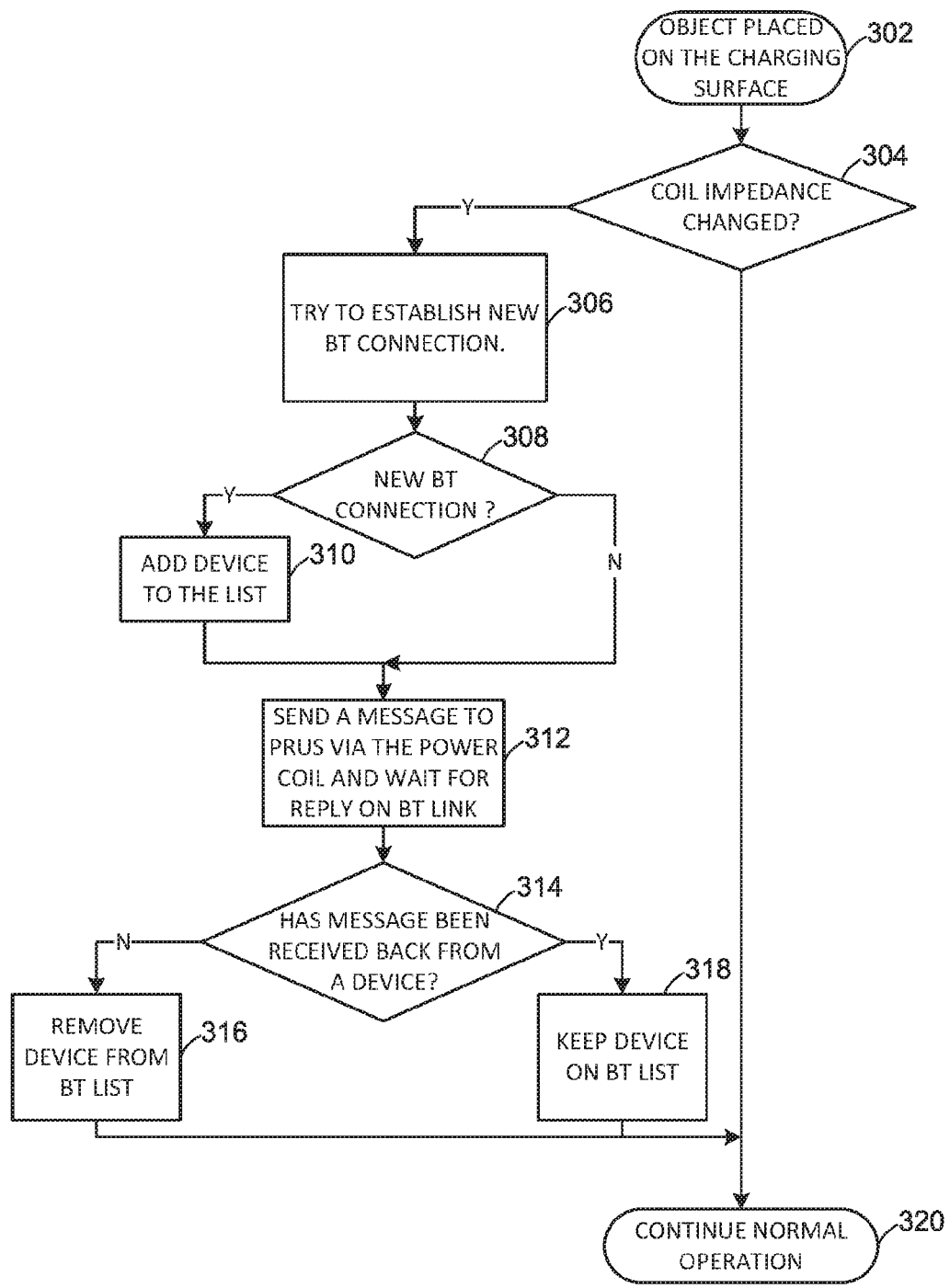
FIGS. 3A-3B illustrate flow diagrams for wireless charger cross-talk prevention, in accordance with one or more example embodiments of the present disclosure.
Figure 3B:
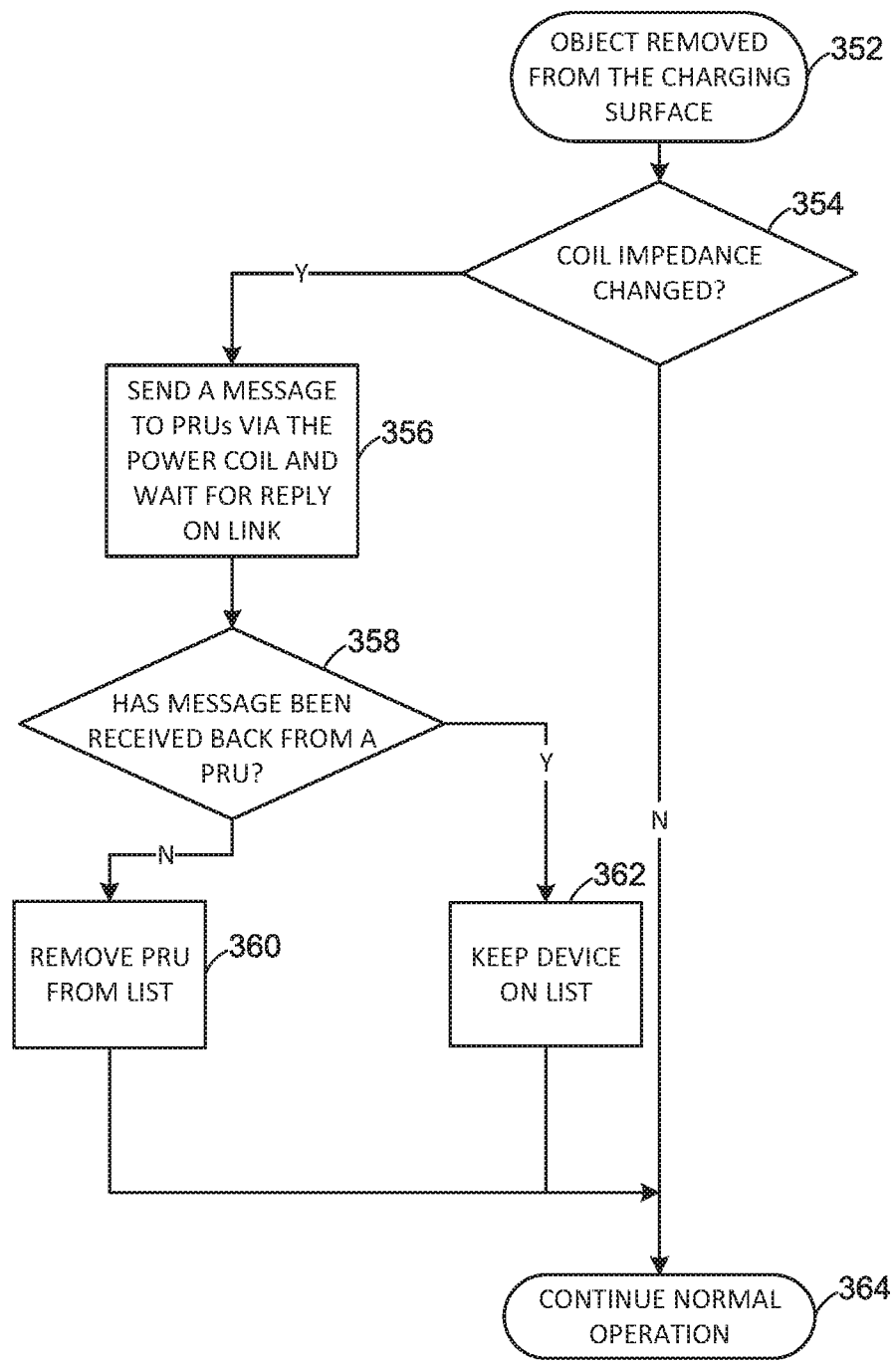

FIGS. 3A-3B illustrate flow diagrams for wireless charger cross-talk prevention, in accordance with one or more example embodiments of the present disclosure.

A PTU may detect the presence of one or more devices that may be in proximity of its charging surface. The PTU may utilize one or more discovery procedures to discover devices in its proximity. For example, the PTU may determine whether one or more PRUs, e.g., (user devices 120 of FIG. 1) require to be wirelessly charged by the PTU. The PTU may also discover the one or more PRUs in the proximity of the PTU based on received messages from the one or more PRUs. For example, the PTU may receive advertisement messages, service request messages, handshake messages, or the like from these PRUs. Many scenarios involve unintentional cross-talk between the PRUs and the PTUs such as in the case of a PRU that is placed on the charging surface or a PRU that is being removed from the charging surface of a PTU. These two scenarios will be described in the flow diagrams of FIGS. 3A and 3B for illustrative purposes.

Referring to FIG. 3A, a wireless charger cross-talk prevention flow diagram may start and proceed to block 302.

At block 302, the PRU may be placed on a charging surface of a PTU. In this case, the coil impedance may be changed due to the presence of the PRU. The PTU may maintain a communication link list that contains one or more PRUs that are recognized by the PTU because at one point they either are associated with the PTU or may have been granted access to the charging capability of the PTU.

At block 304, the PTU may determine whether the coil impedance has changed. In the case where the coil impedance has changed, this may indicate that the PRU may be charging or otherwise will need to establish a connection with the PTU in order to charge itself.

At block 306, if the coil impedance on the PTU has changed, the PTU may determine or otherwise may try to establish a new communication link with the PRU.

At block 308, the PTU may determine whether the communication link is an existing communication link indicating a known PRU or the PTU may determine whether this is a new communication link with the PRU.

At block 310, if the communication link is a new communication link, the PTU may add the PRU to the communication link list. If the communication link is a known link, the PTU may determine that the PRU is already on the communication link list.

At block 312, the PTU may send an enhanced message to the PRUs that are in communication with the PTU. The PTU may embed this enhanced message using either BPSK or any other PSK modulated techniques into a sine signal generated by the power coil of the PTU and transmit it to the PRUs in proximity of the PTU. The embedded enhanced message may be comprised at least in part of one or more identifying information associated with the PTU. For example, the one or more identifying information may include a unique PTU's MAC address, a unique coil number, or a randomly generated number. It should be understood that the PTU may be charging more than one PRU.

At block 314, the PTU may wait for a feedback message to be received from a PRU. When the PRU receives the enhanced message, it may extract or otherwise decode the enhanced message in order to retrieve the one or more identifying information. At this point, the PRU may send a feedback message to the PTU. The feedback message may or may not include one of the one or more identifying information.

At block 316, if the PTU did not receive the feedback message from the PRU, the PTU may remove the PRU from the communication link list since it considers the PRU as a rogue PRU or an unrecognized PRU.

At block 318, if the PTU did receive the feedback message from the PRU, the PTU may determine, based at least on receiving the feedback message, that the PRU is intended, or at least authorized to charge itself using the transmit coil(s) of the PTU. In another embodiment, the PTU may extract or otherwise decode information from the feedback message. If the information matches at least one of the identifying information that the PTU sent to the PRU, then the PTU may determine that the PRU is intended, or at least authorized to charge itself using the transmit coil(s) of the PTU. In this case, the PTU may keep the PRU on the communication link list.

At block 320, the PTU may continue normal operation. It is understood that the above descriptions are for purposes of illustration and are not meant to be limiting.

Referring to FIG. 3B, a wireless charger cross-talk prevention flow diagram may start and proceed to block 352.

At block 352, a PRU may have been removed from the charging surface of a PTU. This event may cause a coil impedance change due to the removal of the PRU.

At block 354, the PTU may determine whether the coil impedance has changed.

At block 356, the PTU may send a message to all the PRUs that may be in proximity to the PTU. The PTU may use its coil in order to send an enhanced message. The PTU may embed this enhanced message using either binary phase shift key (BPSK) or any other PSK modulated techniques into a sine signal generated by the power coil of the PTU and transmit it to the PRUs in proximity of the PTU. The embedded enhanced message may be comprised at least in part of one or more identifying information associated with the PTU. For example, the one or more identifying information may include a unique PTU's MAC address, a unique coil number, and/or a randomly generated number. For example, if the PRU receives the MAC address of the PTU, the PRU may determine, based on that information, whether it is supposed to be connected to that PTU. On the other hand, if a message is a randomly generated number by a PTU, the PRU has to transmit this message back via the communication link, and the PTU will make a decision to keep the PRU connected or to disconnect it. It should be understood that the PTU may be charging more than one PRU.

At block 358, the PTU may determine whether any of the PRUs sent back a feedback message.

At block 360, if the PTU did not receive the feedback message from a PRU, the PTU may remove the PRU from a communication link list. The communication link list is a list of known or associated PRUs that the PTU recognizes and is responsible for charging these PRUs.

At block 362, if the PTU did receive the feedback message from the PRU, the PTU may determine, based at least on receiving the feedback message, that the PRU is intended, or at least authorized to charge itself using the transmit coil(s) of the PTU. In another embodiment, the PTU may extract or otherwise decode information from the feedback message. If the information matches at least one of the identifying information that the PTU sent to the PRU, then the PTU may determine that the PRU is intended, or at least authorized to charge itself using the transmit coil(s) of the PTU. In this case, the PTU may keep the PRU on the communication link list.

At block 364, the PTU may continue normal operation. It is understood that the above descriptions are for purposes of illustration and are not meant to be limiting.

Figure 4:
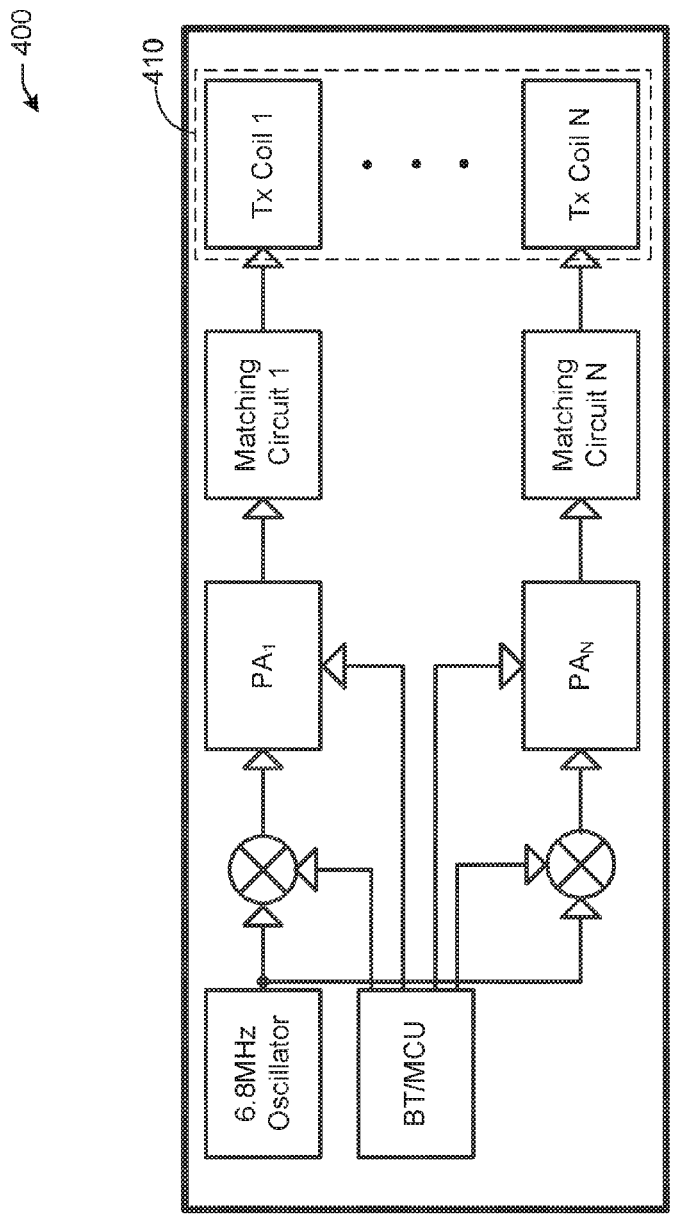
FIG. 4 illustrates an illustrative diagram of a power transmitting unit (PTU) with multiple transmit coils, in accordance with one or more example embodiments of the present disclosure.

FIG. 4 depicts an illustrative diagram of a PTU 400 with multiple transmit coils, in accordance with one or more example embodiments of the present disclosure.

Referring to FIG. 4, the PTU 400 may comprise one or more hardware components associated with multiple coils 410 (e.g., coils 1, . . . , N, where N is a positive integer). This PTU 400 may charge multiple PRUs based at least in part on the number of coils. In this case, the cross-talk interference may happen between one or more PRUs that may be connected with one or more coils of the PTU 400. The PTU 400 may need to determine which PRU is placed on which coil in order to implement a cross-talk prevention.

In one embodiment, the PTU 400 may implement the blocks of FIGS. 3A and 3B based at least in part on the identified scenario. For example, in a scenario where a PRU is placed on the charging surface of the PTU 400 in association with one TX coil, the PTU 400 may implement the blocks of FIG. 3A, with one or more modifications. In a scenario where a PRU is removed from the charging surface associated with a TX coil, the PTU 400 may implement the blocks of FIG. 3B, with one or more modifications.

In one embodiment, the PTU 400 may embed an enhanced message using either BPSK or any other PSK modulated techniques into a sine signal generated by the power coil of the PTU and transmit it to the PRUs in proximity of the PTU. The embedded enhanced message may include, at a minimum, the MAC address of the PTU and a unique coil number or a randomly generated number. The reason is that an MAC address may not be enough to differentiate between the TX coils of the PTU 400. The PTU 400 may require the PRU to send back, in a feedback message, the MAC address and the unique coil number and/or the randomly generated number to help the PTU 400 to differentiate between the TX coils. It is understood that the above descriptions are for purposes of illustration and are not meant to be limiting.

Figure 5A:
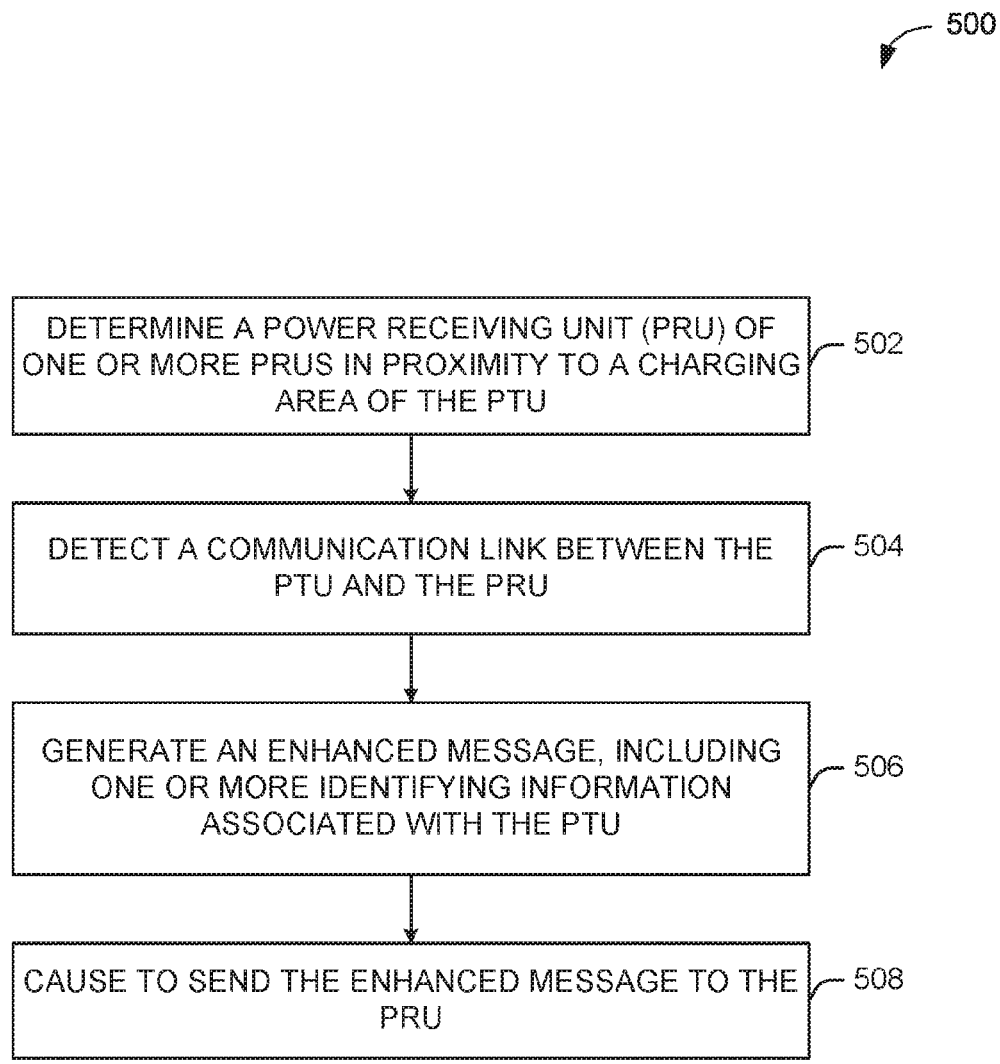
FIG. 5A illustrates a flow diagram of an illustrative process for wireless charger cross-talk prevention, in accordance with one or more embodiments of the disclosure.

FIG. 5A illustrates a flow diagram of an illustrative process 500 for wireless charger cross-talk prevention, in accordance with one or more example embodiments of the present disclosure.

At block 502, a PTU (e.g., PTU 102 of FIG. 1) may determine the presence of one or more PRUs (e.g., user devices 120 of FIG. 1) in proximity to a charging area of the PTU. For example, the PTU may detect the presence of one or more PRUs that may be in proximity of its charging surface. The PTU may utilize one or more discovery procedures to discover devices in its proximity. For example, the PTU may determine whether one or more PRUs require to be wirelessly charged by the PTU.

At block 504, the PTU may detect a communication link between the PTU and the PRU. For example, a PRU may connect to the PTU through a communication link. The communication link may include a link in accordance with at least one of bluetooth low energy (BLE), in-band modulation, or any other communication protocols that may be used for communicating between two devices. When a PRU is either placed on or removed from the PTU, impedance of the PTU may change. When the PRU is placed on the PTU, the impedance of the system may increase. After the PRU and the PTU establish a communication link (e.g., a BT link), the PTU's power output may be dictated by PRUs based on their need and their category. However, in public places, there is a likelihood that a PRU may establish a communication link with an adjacent PTU while it is charging on a current PTU. Public places may include places such as conference rooms, airports, cafeterias, etc. When the PRU establishes a communication link with the adjacent PTU, the PRU may control this adjacent PTU resulting in wireless charging cross-talk from one PRU to two PTUs At block 506, the PTU may generate an enhanced message, including one or more identifying information associated with the PTU. For example, the PTU may embed this enhanced message using either BPSK or any other PSK modulated techniques into a sine signal generated by the power coil of the PTU and transmit it to the PRUs in proximity of the PTU. The embedded enhanced message may be comprised at least in part of one or more identifying information associated with the PTU. For example, the one or more identifying information may include a unique PTU's MAC address, a unique coil number, and/or a randomly generated number. It should be understood that the PTU may be charging more than one PRU. In addition, it should be understood that the PTU may have more than one charging coil (e.g., TX coil). In that case, the PTU may include additional information in order to differentiate between the TX coils. For example, the PTU may send, in addition to the PTU's MAC address, a unique call number and/or a randomly generated number. It should be understood that additional information may be used in order to assist the PTU to differentiate between itself and other PTUs and to differentiate between one or more of its charging coils.

At block 508, the PTU may cause to send the enhanced message to the PRU. The PTU may send an enhanced message to the PRUs that are in communication with the PTU. The PTU may wait for a feedback message to be received from a PRU. When the PRU receives the enhanced message, it may extract or otherwise decode the enhanced message in order to retrieve the one or more identifying information. In some embodiments, the PTU may determine an impedance change of its coil based on a removal of a PRU from the charging surface of the PTU. This also may trigger the PTU to send the enhanced message to the PRU. If the PTU receives a feedback message from the PRU, the PTU may determine whether to disconnect the communication link with the PRU and/or whether to remove the PRU from a communication link list. The communication link list is a list of known or associated PRUs that the PTU recognizes and is responsible for charging these PRUs.

It is understood that the above descriptions are for purposes of illustration and are not meant to be limiting.

Figure 5B:
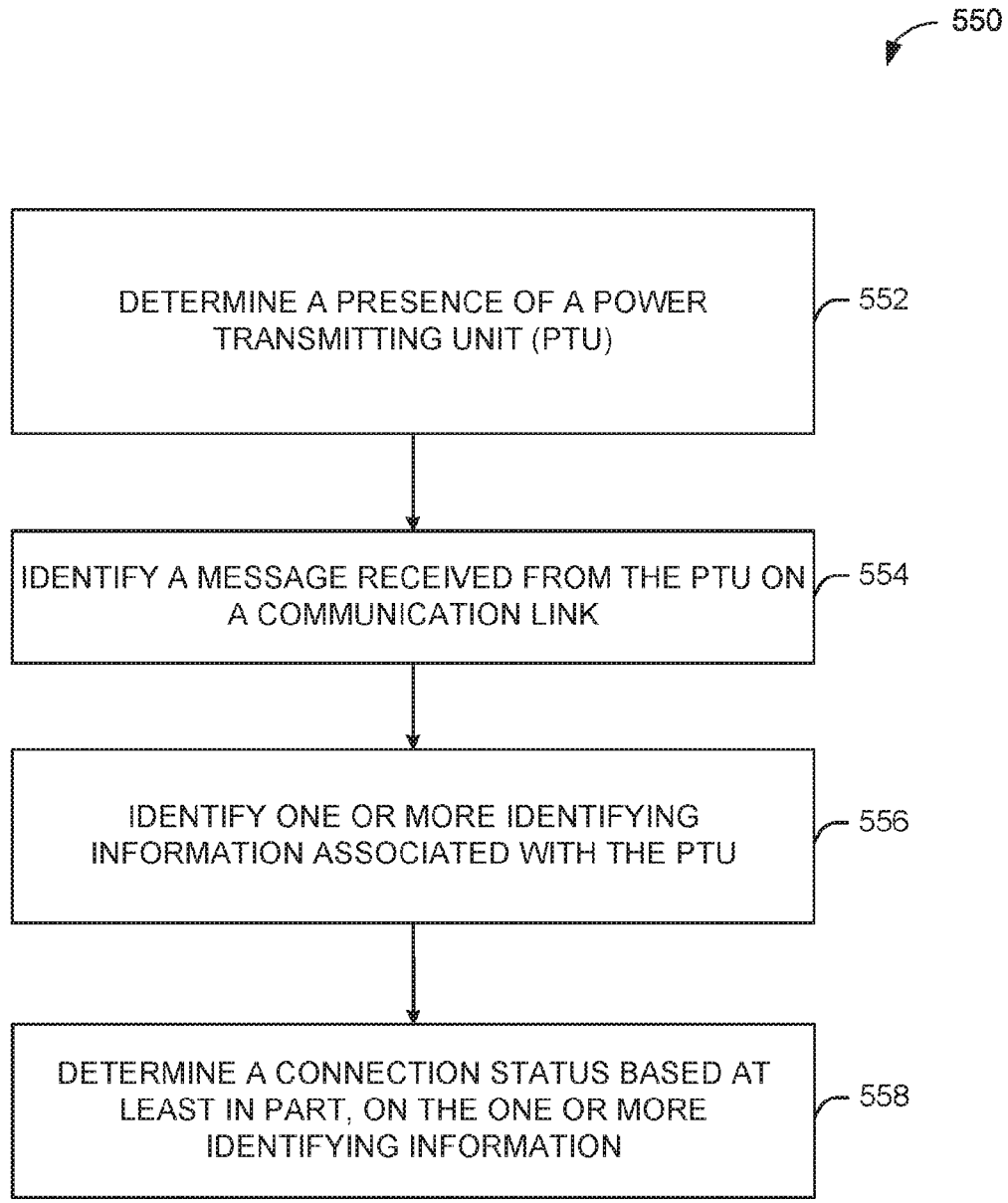
FIG. 5B illustrates a flow diagram of an illustrative process for wireless charger cross-talk prevention, in accordance with one or more embodiments of the disclosure.

FIG. 5B illustrates a flow diagram of an illustrative process 550 for a wireless charger cross-talk prevention system, in accordance with one or more example embodiments of the present disclosure.

At block 552, a PRU (e.g., the user devices 120 of FIG. 1) may determine the presence of a PTU (e.g., the PTU 102 of FIG. 1). The PTU may include a surface area that can be used to charge one or more PRUs. The PTU's current conducted through its coil generates an electromagnetic field such that when the PRU is placed in the PTU's magnetic field area, the PRU may be wirelessly charged. For example, the PRU may be already connected to the PTU, or the PRU may establish a communication link with the PTU. The communication link may include a link in accordance with at least one of bluetooth low energy (BLE), in-band modulation, or any other communication protocols that may be used for communicating between two devices. When a PRU is either placed on or removed from the PTU, impedance of the PTU may change. It should be understood that the PTU may have one or more charging coils in order to charge one or more PRUs. In addition, it should be understood that one PTU may charge one or more PRUs. In order for the PTU to determine whether a PRU is authorized to charge itself using the charging coil(s) of the PTU, the PTU may generate an enhanced message that may comprise one or more identifying information associated with the PTU. This information may be sent to the PRU using the enhanced message such that the PTU waits for a feedback message or no message from the PRU. Based on that, the PTU may disconnect the communication link with the PRU and therefore prevent cross-talk interference.

At block 554, the device may identify a message received from the PTU on a communication link. The PTU may embed the message using either BPSK or any other PSK modulated techniques into a sine signal generated by the power coil of the PTU and transmit it to the PRUs in proximity of the PTU.

At block 556, the device may identify one or more identifying information associated with the PTU. The one or more identifying information may include a unique PTU's MAC address, a unique coil number, or a randomly generated number. It should be understood that the PTU may be charging more than one PRU. In addition, it should be understood that the PTU may have more than one charging coil (e.g., TX coil). In that case, the PTU may include additional information in order to differentiate between the TX coils. For example, the PTU may send, in addition to the PTU's MAC address, a unique call number and/or a randomly generated number. It should be understood that additional information may be used in order to assist the PTU to differentiate between itself and other PTUs and to differentiate between one or more of its charging coils. In addition, it should be understood that the PTU may have more than one charging coil (e.g., TX coil). In that case, the PTU may include additional information in order to differentiate between the TX coils. For example, the PTU may send, in addition to the PTU's MAC address, a unique coil number and/or a randomly generated number. It should be understood that additional information may be used in order to assist the PTU to differentiate between itself and other PTUs and to differentiate between one or more of its charging coils.

At block 558, the device may determine a connection status based at least in part on the one or more identifying information. The PTU may determine whether to disconnect the communication link with the PRU and/or whether to remove the PRU from a communication link list. The communication link list is a list of known or associated PRUs that the PTU recognizes and is responsible for charging these PRUs. In other examples, the PRU may determine to either stay connected or disconnect from the PTU based on information received and identified in the message received from the PTU. For example, if the PRU receives the MAC address of the PTU, the PRU may determine, based on that information, whether it is supposed to be connected to that PTU. On the other hand, if a message is a randomly generated number by a PTU, the PRU has to transmit this message back via the communication link, and the PTU will make a decision to keep PRU connected or to disconnect it. It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as a PTU 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2, 3, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a cross-talk prevention device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The cross-talk prevention device 719 may carry out or perform any of the operations and processes (e.g., the processes 500 and 550) described and shown above. For example, the cross-talk prevention device 719 may be configured to embed a message using either binary phase shift key (BPSK) or any other PSK modulated techniques into a sine signal generated by the power coil of a PTU and transmit it to the PRUs in proximity of the PTU.

The cross-talk prevention device 719 may deliver the embedded message to one or more PRUs that are determined to be placed on or are determined to be near the PTU at a predetermined time.

The cross-talk prevention device 719 may determine the embedded message is comprised at least in part of a unique PTU's MAC address, a unique coil number, and/or a randomly generated number. For example, in case the message includes the MAC address, the PRU may determine to either stay connected or disconnect from the PTU, assuming that a PRU has the PTU's MAC address from the communication link. On the other hand, if a message is a randomly generated number by a PTU, the PRU has to transmit this message back via the communication link, and the PTU may make a decision to keep PRU connected.

It is understood that the above are only a subset of what the cross-talk prevention device 719 may be configured to perform and that other functions included throughout this disclosure may also be performed by the cross-talk prevention device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a PTU. The PTU may include memory and processing circuitry configured to determine a power receiving unit (PRU) in proximity to a charging area of the PTU. The memory and processing circuitry may be further configured to determine an impedance change associated with a charging coil of the PTU. The memory and processing circuitry may be further configured to generate an enhanced message, including one or more identifying information associated with the PTU. The memory and processing circuitry may be further configured to cause to send the enhanced message to the PRU.

The implementations may include one or more of the following features. The memory and the processing circuitry are further configured to include an acknowledgment request indication in the enhanced message. The memory and the processing circuitry are further configured to detect a communication link between the PTU and the PRU. The communication link is a bluetooth low energy (BLE) communication link, near field communication (NFC) communication link, in-band modulation, or Wi-Fi communication link. The one or more identifying information include at least one of a medium access control (MAC), a coil number, or a randomly generated number. The memory and the processing circuitry are further configured to identify a feedback message from the PRU, the feedback message including a response to the enhanced message. The memory and the processing circuitry are further configured to determine the feedback message may include at least one of the one or more identifying information received in the enhanced message. The memory and processing circuitry may be further configured to cause to add the PRU to a communication list associated with one or more recognized PTUs. The memory and the processing circuitry are further configured to determine the feedback message does not include the one or more identifying information. The memory and processing circuitry may be further configured to cause to determine to remove the PRU from the communication list. The memory and the processing circuitry are further configured to determine a feedback message is not received from the PRU after a predetermined time. The memory and processing circuitry may be further configured to cause to determine to remove the PRU from the communication list. The PTU may further include a transceiver configured to transmit and receive wireless signals. The PTU may further include one or more antennas coupled to the transceiver.

According to example embodiments of the disclosure, there may be a non-transitory computer-readable medium storing computer-executable instructions which, when executed by a processor, cause the processor to perform operations. The operations may include determining a presence of a power transmitting unit (PTU). The operations may include identifying a message received from the PTU on a communication link. The operations may include identifying one or more identifying information associated with the PTU. The operations may include determining a connection status based at least in part, on the one or more identifying information.

The implementations may include one or more of the following features. The communication link is in accordance with bluetooth low energy (BLE), near field communication (NFC), in-band modulation, or Wi-Fi. The PTU may include one or more charging coils. The operations further may include causing to send a feedback message to the PTU, wherein the feedback message may include the one or more identifying information. The operations further may include determining to disconnect the communication link based at least in part on the one or more identifying information. The feedback message may include at least one of the one or more identifying information.

According to example embodiments of the disclosure, there may include a method. The method may include determining, by one or more processors, a power receiving unit (PRU) in proximity to a charging area of a power transmitting unit (PTU). The method may include determining an impedance change associated with a charging coil of the PTU. The method may include generating an enhanced message, including one or more identifying information associated with the PTU. The method may include causing to send the enhanced message to the PRU.

The implementations may include one or more of the following features. The method may further include identifying a feedback message from the PRU, the feedback message including a response to the enhanced message. The method may further include determining the feedback message includes at least one of the one or more identifying information received in the enhanced message. The method may include causing to add the PRU to a communication list associated with one or more recognized PTUs. The method may further include including an acknowledgment request indication in the enhanced message. The method may further include detecting a communication link between the PTU and the PRU. The communication link is a bluetooth low energy (BLE) communication link, near field communication (NFC) communication link, in-band modulation, or Wi-Fi communication link. The one or more identifying information include at least one of a medium access control (MAC), a coil number, or a randomly generated number. The method may further include determining the feedback message does not include the one or more identifying information. The method may include causing to determine to remove the PRU from the communication list. The method may further include determining a feedback message is not received from the PRU after a predetermined time. The method may include causing to determine to remove the PRU from the communication list.

In example embodiments of the disclosure, there may be an apparatus. The apparatus may include means for determining, by one or more processors, a power receiving unit (PRU) in proximity to a charging area of a power transmitting unit (PTU). The apparatus may include means for determining an impedance change associated with a charging coil of the PTU. The apparatus may include means for generating an enhanced message, including one or more identifying information associated with the PTU. The apparatus may include means for causing to send the enhanced message to the PRU.

The implementations may include one or more of the following features. The apparatus may further include means for identifying a feedback message from the PRU, the feedback message including a response to the enhanced message. The apparatus may further include means for determining the feedback message includes at least one of the one or more identifying information received in the enhanced message. The apparatus may include means for causing to add the PRU to a communication list associated with one or more recognized PTUs. The apparatus may further include means for including an acknowledgment request indication in the enhanced message. The apparatus may further include means for detecting a communication link between the PTU and the PRU. The communication link is a bluetooth low energy (BLE) communication link, near field communication (NFC) communication link, in-band modulation, or Wi-Fi communication link. The one or more identifying information include at least one of a medium access control (MAC), a coil number, or a randomly generated number. The apparatus may further include means for determining the feedback message does not include the one or more identifying information. The apparatus may include means for causing to determine to remove the PRU from the communication list. The apparatus may further include means for determining a feedback message is not received from the PRU after a predetermined time. The apparatus may include means for causing to determine to remove the PRU from the communication list.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A power transmitting unit (PTU), the PTU comprising memory and processing circuitry configured to:
   determine a power receiving unit (PRU) in proximity to a charging area of the PTU;
   determine an impedance change associated with a first coil of one or more coils of the PTU;
   generate an enhanced message, including one or more identifying information associated with the PTU, wherein the enhanced message is generated by the first coil; and
   cause to send the enhanced message to the PRU.

2. The PTU of claim 1, wherein the memory and the processing circuitry are further configured to include an acknowledgment request indication in the enhanced message.

3. The PTU of claim 1, wherein the memory and the processing circuitry are further configured to detect a communication link between the PTU and the PRU.

4. The PTU of claim 3, wherein the communication link is a bluetooth low energy (BLE) communication link, a near field communication (NFC) communication link, an in-band modulation, or a Wi-Fi communication link.

5. The PTU of claim 1, wherein the one or more identifying information includes at least one of a medium access control (MAC), a coil number, or a randomly generated number.

6. The PTU of claim 1, wherein the memory and the processing circuitry are further configured to identify a feedback message from the PRU, the feedback message including a response to the enhanced message.

7. The PTU of claim 6, wherein the memory and the processing circuitry are further configured to:

determine the feedback message includes at least one of the one or more identifying information received in the enhanced message; and cause to add the PRU to a communication list associated with one or more recognized PTUs.

8. The PTU of claim 7, wherein the memory and the processing circuitry are further configured to:

determine the feedback message does not include the one or more identifying information; and cause to determine to remove the PRU from the communication list.

9. The PTU of claim 7, wherein the memory and the processing circuitry are further configured to:

determine a feedback message is not received from the PRU after a predetermined time; and cause to determine to remove the PRU from the communication list.

10. The PTU of claim 1, further comprising a transceiver configured to transmit and receive wireless signals.

11. The PTU of claim 10, further comprising one or more antennas coupled to the transceiver.

12. A non-transitory computer-readable medium storing computer-executable instructions which, when executed by a processor, cause the processor to perform operations comprising:

determining a presence of a power transmitting unit (PTU);

identifying a message received from the PTU on a communication link, wherein the message is generated by a first coil of one or more coils of the PTU;

identifying one or more identifying information associated with the PTU; and determining a connection status based at least in part, on the one or more identifying information.

13. The non-transitory computer-readable medium of claim 12, wherein the communication link is in accordance with bluetooth low energy (BLE), near field communication (NFC), in-band modulation, or Wi-Fi.

14. The non-transitory computer-readable medium of claim 12, wherein the PTU includes one or more charging coils.

15. The non-transitory computer-readable medium of claim 12, wherein the operations further comprise causing to send a feedback message to the PTU, wherein the feedback message includes the one or more identifying information.

16. The non-transitory computer-readable medium of claim 12, wherein the operations further comprise determining to disconnect the communication link based at least in part on the one or more identifying information.

17. The non-transitory computer-readable medium of claim 15, wherein the feedback message includes at least one of the one or more identifying information.

18. A method comprising:

determining, by one or more processors, a power receiving unit (PRU) in proximity to a charging area of a power transmitting unit (PTU);

determining an impedance change associated with a first coil of one or more coils of the PTU;

generating an enhanced message, including one or more identifying information associated with the PTU, wherein the message is generated by the first coil; and causing to send the enhanced message to the PRU.

19. The method of claim 18, further comprising identifying a feedback message from the PRU, the feedback message including a response to the enhanced message.

20. The method of claim 19, further comprising:

determining the feedback message includes at least one of the one or more identifying information received in the enhanced message; and causing to add the PRU to a communication list associated with one or more recognized PTUs.

* * * * *